US011269398B2

(12) United States Patent
Gougeon et al.

(10) Patent No.: US 11,269,398 B2
(45) Date of Patent: Mar. 8, 2022

(54) MULTI SLEEP MODE POWER SAVING

(71) Applicant: Hewlett-Packard Development Company, L.P., Spring, TX (US)

(72) Inventors: Dominique Gougeon, Vancouver, WA (US); Frankie Alcazar, Vancouver, WA (US); Paul D Bliley, Vancouver, WA (US); Tyler Kapp, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 217 days.

(21) Appl. No.: 16/606,626

(22) PCT Filed: Apr. 21, 2017

(86) PCT No.: PCT/US2017/028942
§ 371 (c)(1),
(2) Date: Oct. 18, 2019

(87) PCT Pub. No.: WO2018/194676
PCT Pub. Date: Oct. 25, 2018

(65) Prior Publication Data
US 2021/0103329 A1 Apr. 8, 2021

(51) Int. Cl.
*G06F 1/3287* (2019.01)
*G06F 1/3234* (2019.01)
*G06F 13/42* (2006.01)

(52) U.S. Cl.
CPC .......... *G06F 1/3287* (2013.01); *G06F 1/3253* (2013.01); *G06F 1/3275* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 6,678,831 B1 | 1/2004 | Mustafa et al. |
| 9,507,939 B1 * | 11/2016 | Lukacs ................. G06F 3/0622 |
| 2008/0320203 A1 * | 12/2008 | Fitzgerald ........... G06F 12/0292 711/5 |
| 2013/0031392 A1 | 1/2013 | McLane |
| 2013/0083338 A1 | 4/2013 | Fahrenkrug et al. |

(Continued)

OTHER PUBLICATIONS

Lexmark—Saving Money and the Environment, 2007—5 pages— http://publications.lexmark.com/.

*Primary Examiner* — Paul Yen
(74) *Attorney, Agent, or Firm* — HP Inc. Patent Department

(57) ABSTRACT

Reducing power consumption of an electrical device is provided. The electrical device includes a first and a second module. The first and second modules include a first and a second memory, and a first and second system on chip (SoC) respectively. The first and second SoCs include a first and a second micro-processor respectively. A PCI-e bus connects the modules. The second module enters a sleep mode state that includes a first and a second sleep mode. The second module transitions between the first and second sleep modes while in the sleep mode state. The second SoC reduces a power state of the second module during the first sleep mode, and powers off the second SoC during the second sleep mode.

13 Claims, 8 Drawing Sheets

(56) References Cited

U.S. PATENT DOCUMENTS

| | | |
|---|---|---|
| 2013/0201510 A1 | 8/2013 | Miyata |
| 2013/0318384 A1 | 11/2013 | Yoshihara |
| 2014/0118765 A1* | 5/2014 | Yang .................... G06K 15/406 358/1.13 |
| 2015/0346806 A1 | 12/2015 | Dalal et al. |
| 2016/0187952 A1 | 6/2016 | Gough et al. |
| 2016/0363986 A1 | 12/2016 | Swarbrick et al. |
| 2017/0308148 A1* | 10/2017 | Soliman ................ G06F 9/4418 |

* cited by examiner

MULTI SLEEP MODE POWER SAVING

BACKGROUND

Electrical devices may consume electrical energy even when they are not performing their intended functions. Turning off an electrical device when it is not performing its intended function may save considerable amount of energy during the life cycle of the device. However, turning off the electrical device may be inconvenient for the user of the device because it may increase the user wait time for the device to fully power on and become functional. Alternatively, the electrical device may go into a sleep mode to reduce its electrical power consumption when not in use. Transition time from sleep mode to the full power functional mode may be less than the time it takes for the device to turn on from the power off mode.

DETAILED DESCRIPTION

Examples herein provide an electrical device including a first module and a second module. The various modules described by the examples herein and illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which may include a plurality of transistors and other supporting devices and circuit elements. The modules that are configured with electronic circuits process computer logic instructions that provide digital and/or analog signals for performing various functions as described herein. The various functions may be embodied and physically saved as any of data structures, data paths, data objects, data object models, object files, and database components. For example, the data objects may be configured as a digital packet of structured data. The data structures may be configured as any of an array, tuple, map, union, variant, set, graph, tree, node, and an object, which may be stored and retrieved by computer memory and may be managed by processors, compilers, and other computer hardware components. The data paths may be configured as part of a computer central processing unit (CPU) that performs operations and calculations as instructed by the computer logic instructions. The data paths may include digital electronic circuits, multipliers, registers, and buses that perform data processing operations and arithmetic operations such as Add, Subtract, etc., bitwise logical operations such as AND, OR, XOR, etc., bit shift operations such as arithmetic, logical, rotate, etc., complex operations such as using single clock calculations, sequential calculations, iterative calculations, etc. The data objects may be configured as physical locations in computer memory and may be a variable, a data structure, or a function. In the examples configured as relational databases such as Oracle® relational databases, the data objects may be configured as a table or column. Other configurations include specialized objects, distributed objects, object oriented programming objects, and semantic web objects, for example. The data object models may be configured as an application programming interface for creating HyperText Markup Language (HTML) and Extensible Markup Language (XML) electronic documents. The models may be configured as any of a tree, graph, container, list, map, queue, set, stack, and variations thereof. The data object files may be created by compilers and assemblers and contain generated binary code and data for a source file. The database components may include any of tables, indexes, views, stored procedures, and triggers.

Figure 1:
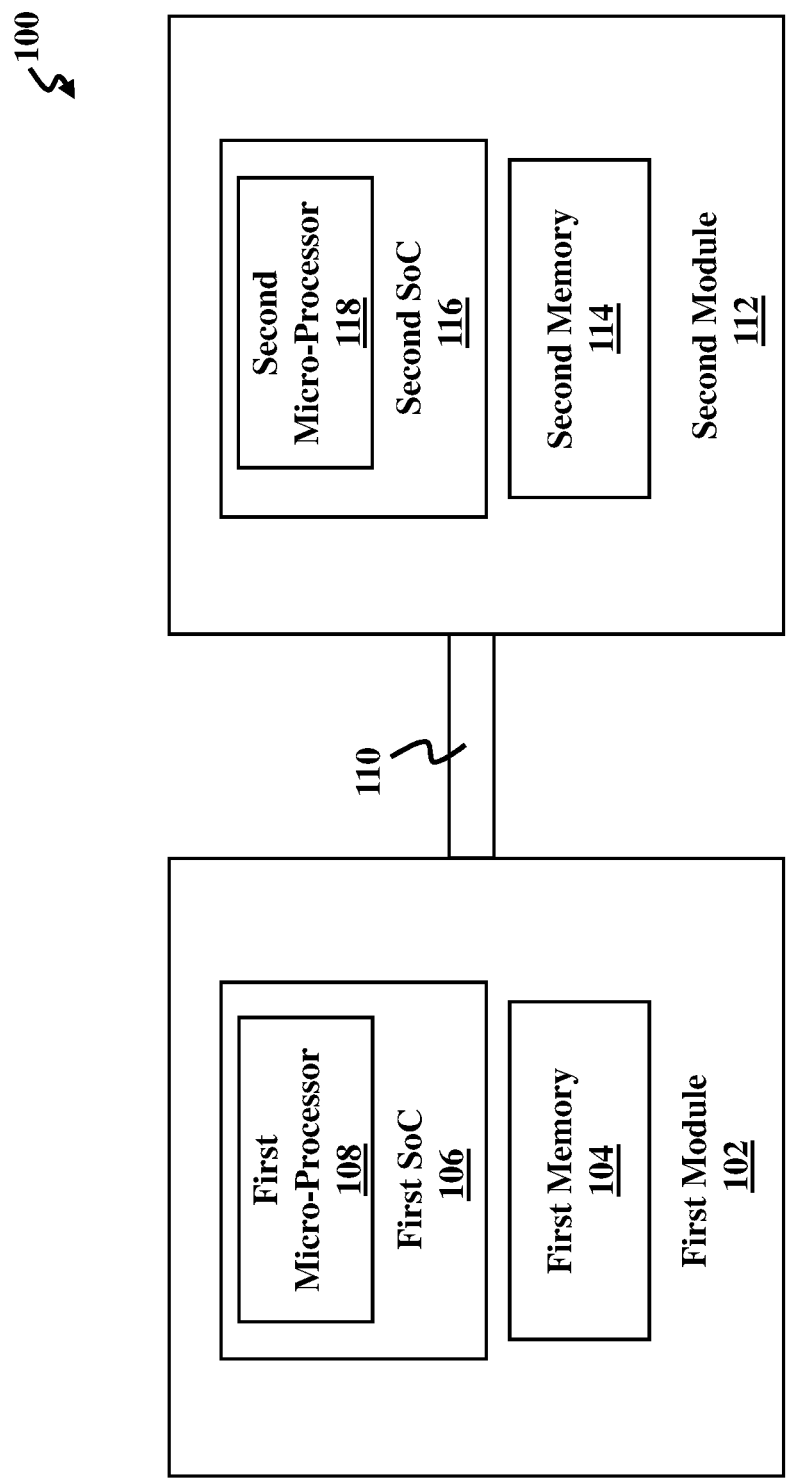
FIG. 1 is a schematic diagram illustrating a system for multi-mode power control, according to an example herein.

FIG. 1 is a schematic diagram illustrating a computer system 100 including a first module 102. The first module 102 may include a first memory 104, and a first system on chip (SoC) 106. The first system on chip 106 may include a first micro-processor 108.

The computer system 100 may include a second module 112 including a second memory 114 and a second SoC 116. The second SoC 116 may include a second micro-processor 118. In an example, the first and second memories 104 and 114 may comprise any of a random access memory (RAM) and read only memory (ROM). In various examples, the first and second micro-processors 108 and 118 may comprise any type of general purpose processor, microcontroller, application specific processor, application specific integrated circuit, and digital signal processor. In a specific example herein, the first and second micro-processors 108 and 118 may comprise a multi-core processor.

The computer system 100 may include a peripheral component interconnect express (PCI-e) bus 110 operatively connected to each of the first module 102 and the second module 112. The second module 112 may enter a sleep mode state. In the sleep mode state, the second module 112 may be in a reduced power consumption state, a stand-by power state, or a minimally functional power state, and the second module 112 may also have less processing capabilities compared with when it is in a fully active power state. In an example herein, the sleep mode may include a first sleep mode and a second sleep mode. The second module 112 may transition between the first sleep mode and second sleep mode while the second module is in the sleep mode state. The second SoC 116 may be configured to reduce a power state of the second module 112 during the first sleep mode and power off the second SoC 116 during the second sleep mode.

In an example, the second module 112 may suspend direct memory access to the second memory 114 while the second module 112 is in the second sleep mode. In another example, the second module 112 may store operating information indicating an operating state of the second SoC 116 in the second memory 114 before the second module 112 transitions to the second sleep mode.

In another example, the second memory 114 retains the operating information in a self-refresh mode while the second module 112 is in the second sleep mode. In an example where the second memory 114 is a Dynamic RAM (DRAM) memory, it requires refresh cycle signals from the second micro-processor 118 to retain its content. However, in the second sleep mode, the second micro-processor 118 may be powered off. In an example, when the second module 112 is in the second sleep mode, the second memory 114 utilizes the self-refresh mode to retain its contents. In an example, in the self-refresh mode, the second memory 114 simulates receiving the refresh cycle signals, and therefore operates in a mode similar to when it receives the refresh cycle signals from the second micro-processor 118. An interrupt signal on the PCI-e bus 110 is disabled while the second module 112 is in the second sleep mode. In an example herein, the first micro-processor 108 may generate the interrupt signal when the second module 112 is in a non-sleep mode, or is in the first sleep mode. The interrupt signal may interrupt a process running on the second micro-processor 118. However, in an example, in the second sleep mode of the second module 112, the second micro-processor 118 is powered off and no interrupt signal may be sent to the second micro-processor 118.

In another example, the second module 112 sends a sleep signal to the first module 122 before the second module 112 transitions to the second sleep mode. The second module 122 may send a location of the second memory 114, where the operating information is stored, to the first module 102. The location of the second memory 114 where the operating information is stored, may be a logical location inside the memory 114, for example a memory address of the location inside the memory 114.

In another example, the first module 102 may send a power up signal to transition the second module 112 from the second sleep mode to the first sleep mode.

In an example, before the second module 112 enters the second sleep mode, the second micro-processor 118 may store the contents of its internal registers in the second memory 114. After storing the register contents in the second memory 114, the second module 112 may transmit a location address of the second memory 114, where the contents of the registers are stored, to the first memory 104, over the PCI-e bus 110.

In another example, the first module 102 may enable the PCI-e bus 110 and send the location to the second module 112 before the second module 112 transitions from the second sleep mode to the first sleep mode. In an example, enabling the PCI-e bus 110 may include activating the signal transmission function of the PCI-e bus 110 so that the signal transmission may occur on the PCI e-bus 110. The location of the second memory 112 where the operating information is stored, may be a logical location inside the memory 112, for example a memory address of the location inside the memory 112.

Figure 2:
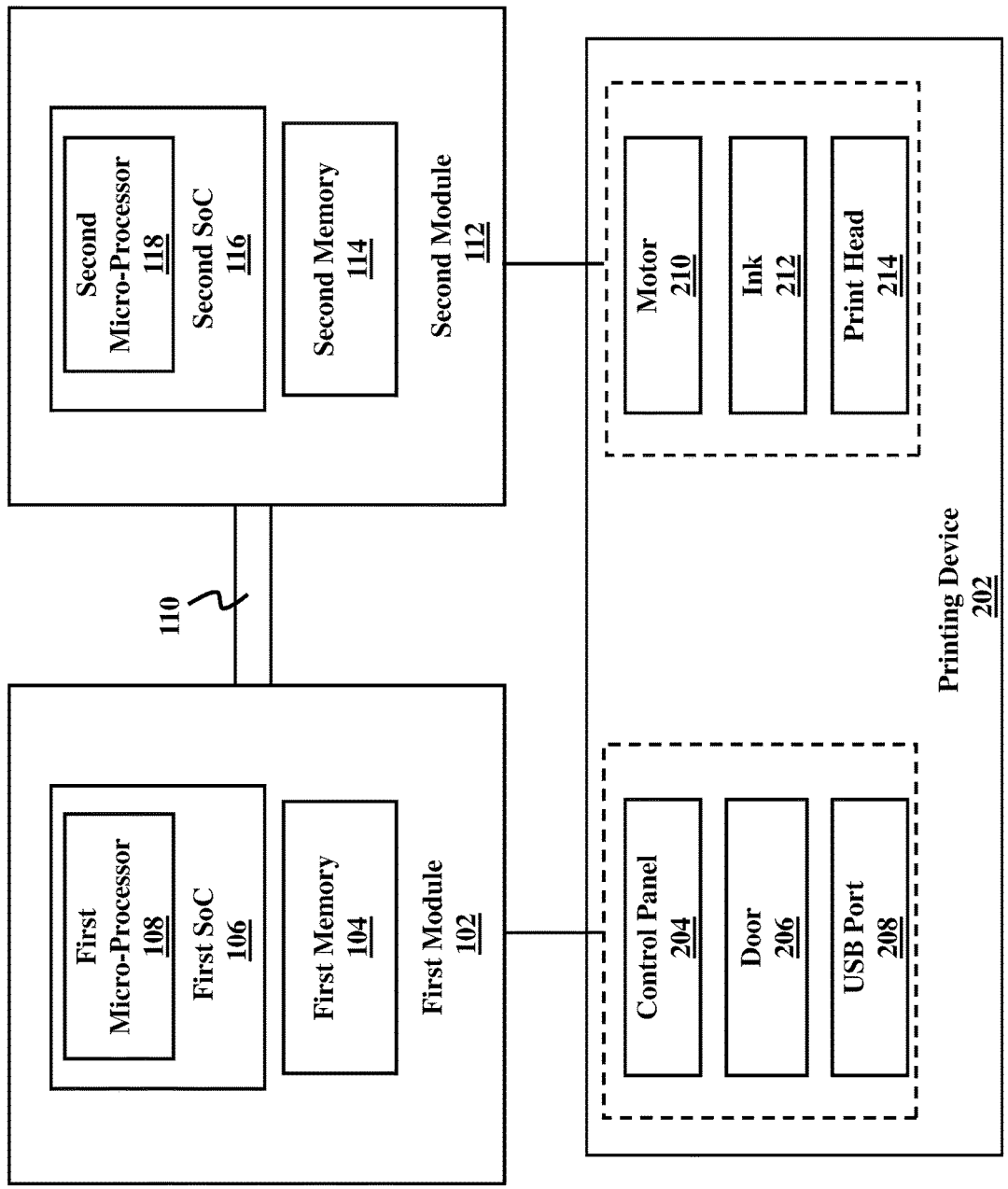
FIG. 2 is a schematic diagram illustrating a system for multi-mode power control of a printing device, according to an example herein.

FIG. 2, with reference to FIG. 1, is a schematic diagram illustrating a system 200 according to an example herein. The first module 102 may be communicatively coupled to any of a user interface control panel 204, door 206, and USB port 208 of a printing device 202. In an example herein, the control panel 204 may be an interactive user interface, such as a touch-screen, where a user may control the system 200. The second module 112 may control any of a motor 210, ink 212, and print head 214 of the printing device 202.

In another example, the first module 102 may send a power up signal to the second module 112 when the first module 102 detects an activity on any of the control panel 204, door 206, and USB port 208 of the printing device 202.

Various examples herein may include both hardware and software elements. The examples that are implemented in software include but are not limited to, firmware, resident software, microcode, etc. Other examples may comprise a computer program product configured to include a pre-configured set of instructions, which when performed, can result in actions as stated in conjunction with the methods described above. In an example, the pre-configured set of instructions may be stored on a tangible non-transitory computer readable medium or a program storage device containing software code.

Figure 3A:
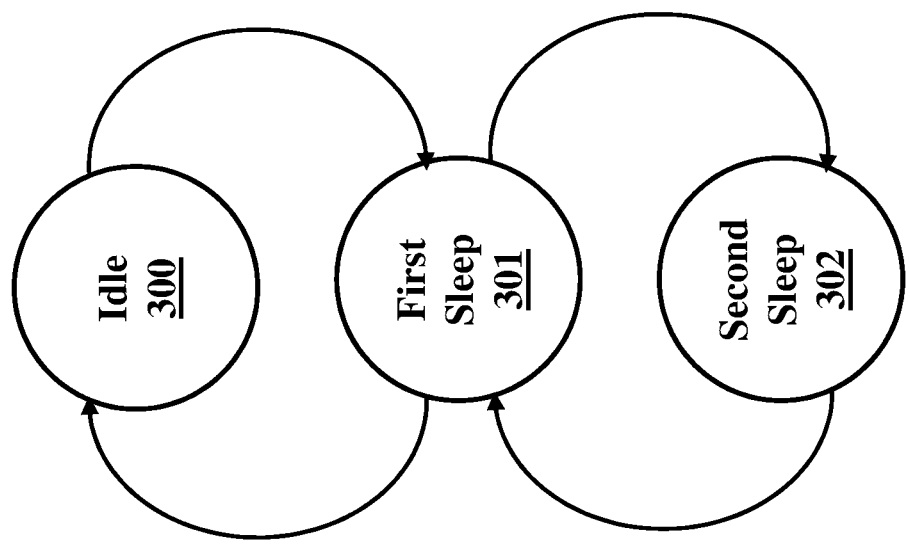
FIG. 3A is state diagram illustrating multi-mode power control, according to an example herein.

FIG. 3A, with reference to FIGS. 1 and 2, is a state diagram illustrating multi-mode power control, according to an example herein. In an example, operation modes of the second module 112 may include an idle mode 300, a first sleep mode 301, and a second sleep mode 302. In an example, any time that the second module 112 is not controlling any of the components of the printing device 202, the second module 112 is in the idle mode 300. In an example, when the second module 112 is idle for more than a first time threshold, it moves to the first sleep mode 301. In the first sleep mode 301, the second module 112 may have limited functionalities, and therefore its power consumption level, in the first sleep mode 301, may be lower than its power consumption in the idle mode 300.

In an example herein, when the first module 102 detects an activity, for example any of the activities described above with reference to FIG. 2, the second module 112 may return from the first sleep mode 301 to the idle mode.

In an example herein, when the second module 112 is in the first sleep mode 301 for more than a second time threshold, it moves to the second sleep mode 302. In an example herein, the second time threshold may be five seconds. In the second sleep mode 302, the second micro-processor 118 of the second module 112 may be powered off. Therefore, the power consumption level of the second module 112 in the second sleep mode 302, is lower than its power consumption level in the first sleep mode 301. In an example, when the first module 102 detects an activity, it sends the power up signal on the PCI-e bus. The power-up signal re-establishes communication on the PCI-e bus 110 and restores power to the second module 112. 110 that cause the second module 112 to move from the second sleep mode 302 to the first sleep mode 301. In an example, the module 112 may consume approximately 26 Watts of electrical power in the idle mode 300, approximately 18 Watts of electrical power in the first sleep mode 301, and approximately 2.6 Watts of electrical power in the second sleep mode 302.

Figure 3B:
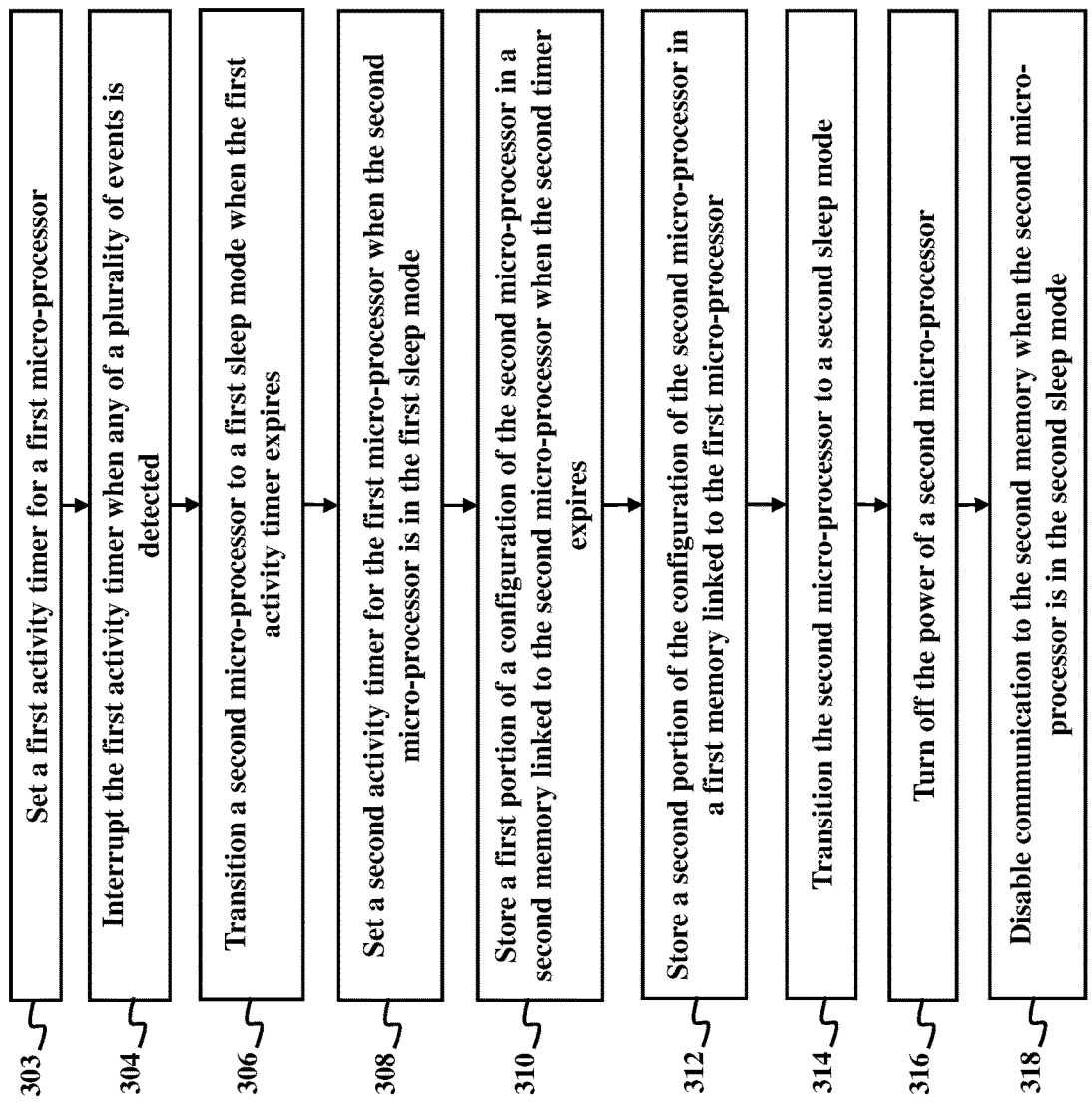
FIG. 3B is a flowchart illustrating a method for multi-mode power control, according to an example herein.

FIG. 3B, with reference to FIGS. 1 through 3A, is a flowchart illustrating a multi-mode power control method 350, according to an example herein. In block 303, the method 350 may set a first activity timer for a first micro-processor 108. In an example, the first time is set to the first time threshold. In block 304, the method 350 may interrupt the first activity timer when any of a plurality of events is detected. In an example, the plurality of events may include an input signal, such as an input generated by a user due to a user's action in interacting with the printing device 202; e.g., sending a print job, making a photocopy, opening a door of the printing device 202 to add/change paper, connecting a flash drive to the USB port, etc.

In block 306, the method 350 may transition a second micro-processor 118 to a first sleep mode 301 when the first activity timer expires. The second micro-processor 118 may consume lower power in the first sleep mode 301 compared with a non-sleep mode, and also the processing capabilities of the second micro-processor 118 may be less than when it is not in a sleep mode In block 308, the method 350 may set a second activity timer for the first micro-processor 108 when the second micro-processor 118 is in the first sleep mode 301. In an example, the second activity timer is set to the second time threshold. In an example herein, the second time threshold may be five seconds. In block 310, the method 350 may store a first portion of a configuration of the second micro-processor 118 in a second memory 114 linked to the second micro-processor 118 when the second timer expires.

In block 312, the method 350 may store a second portion of the configuration of the second micro-processor 118 in a first memory 104 linked to the first micro-processor 108. In block 314, the method 350 may transition the second micro-processor 118 to a second sleep mode 302 when the second timer expires. In block 316, the method 350 may turn off the power of a second micro-processor 118. In block 318, the method 350 may disable communication to the second memory 114 when the second micro-processor 118 is in the second sleep mode 302. In an example herein, the method 350 may disable a PCI-e bus 110 communicatively coupling the first and second micro-processors 108 and 118 while the second micro-processor 118 is in the second sleep mode 302. In another example herein, the method 350 may identify communication of the first micro-processor 108 to any of a control panel 204, door 206, and USB port 208 of a printing device 202. In this regard, the first micro-processor 108 may be sending or receiving a signal to/from any of the control panel 204, door 206, and USB port 208 of the printing device 202. Once the signal has been identified as coming to/from one of these components, a communication link is established between the first microprocessor 108 and any of the control panel 204, door 206, and USB port 208.

In another example, the method 350 may instruct the second micro-processor 118 to control any of a motor 210, ink 212, and print head 214 of the printing device 202. In another example, the method 350 may send a power up signal to transition the second micro-processor 118 from the second sleep mode 302 to the first sleep mode 301.

In another example, the method 350 sends the power up signal to the second micro-processor 118 when the first micro-processor 108 detects an activity on any of the control panel 204, door 206, and USB port 208 of the printing device 202. In various examples, the activities may include opening the door 206 or entering a command into the user interface control panel 204 by a user, or inserting a device, such as a flash drive, into the USB port 208 requesting a print job from the printing device 202.

In various examples herein, the first and second microprocessors 108 and 118 may comprise any type of general purpose processor, microcontroller, application specific processor, application specific integrated circuit, and digital signal processor.

In an example, in response to the power up signal, the method 350 may transition from the block 318 where the second module 112 is in the second sleep mode 302, to the block 308 where the second module 112 is in the first sleep mode, and reset the second activity timer.

Figure 3C:
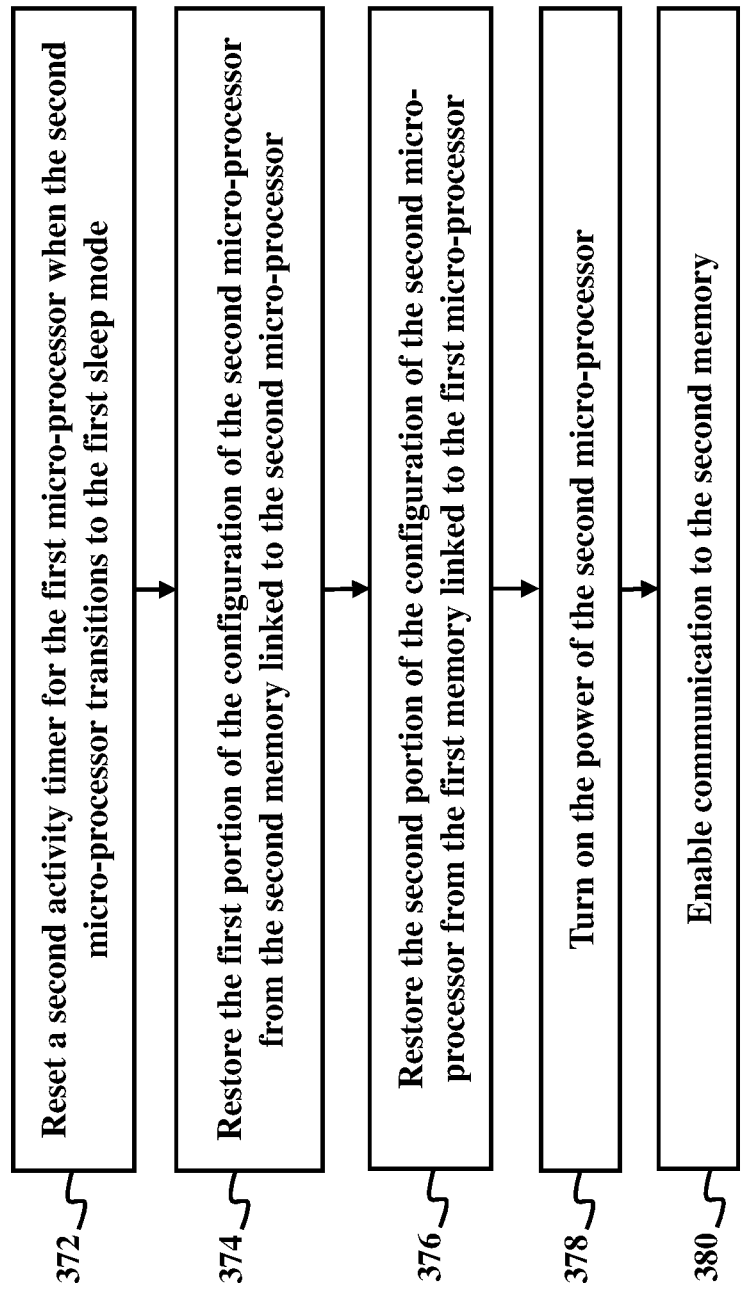
FIG. 3C is a flowchart illustrating a method for multi-mode power control, according to another example herein.

FIG. 3C, with reference to FIGS. 1 through 3B, is a flowchart illustrating a method 370 for transitioning the second module 212 from the second sleep mode 302 to the first sleep mode 301, according to an example herein.

In block 372, the method 370 may reset the second activity timer for the first micro-processor 108 when the second micro-processor 118 is in the first sleep mode 301. In an example, the second activity timer is set to the second time threshold. In an example herein, the second time threshold is five seconds. In block 374, the method 370 may restore the first portion of the configuration of the second micro-processor 118 from the second memory 114 linked to the second micro-processor 118 when the second timer expires.

In block 376, the method 370 may restore the second portion of the configuration of the second micro-processor 118 from the first memory 104 linked to the first micro-processor 108. In block 378, the method 370 may turn on the power of the second micro-processor 118. In block 380, the method 370 may enable communication to the second memory 114 when the second micro-processor 118 is in the first sleep mode 301.

Figure 4:
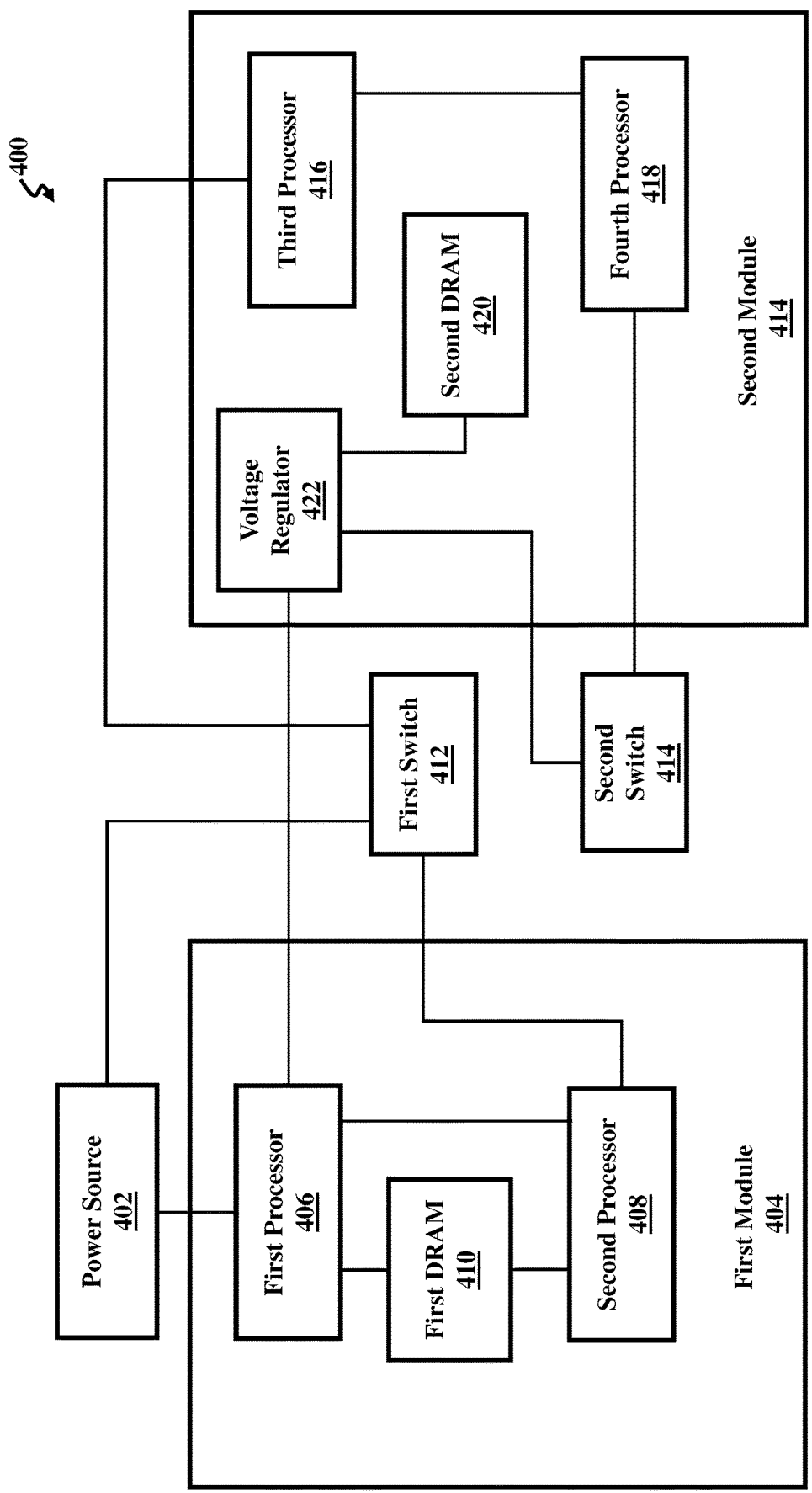
FIG. 4 is a schematic diagram illustrating a power distribution system for multi-mode power control, according to an example herein.

FIG. 4 with reference to FIGS. 1 through 3C, is a schematic diagram illustrating a power management system 400, according to an example herein. The system 400 may include an input power source 402 and a first module 404. The first module 404 may include a first processor 406 electrically coupled to the input power source 402. The first module 102 may include a second processor 408 electrically coupled to the first processor 406.

The first module 404 may include a first dynamic random access memory (DRAM) 410 electrically coupled to the first and second processors 406 and 408. The system 400 may include a first power switch 412 electrically coupled to the input power source 402 and to the second processor 408.

The system 400 may include a second module 414. The second module 414 may include a voltage regulator 422 electrically coupled to the first processor 406, a second DRAM 420 electrically coupled to the voltage regulator 422, a third processor 416 electrically coupled to the first power switch 412, and a fourth processor 418 electrically coupled to the third processor 416.

In an example, the system 400 may include a second power switch 414 electrically coupled to the voltage regulator 422 and the fourth processor 418. The second module 414 may transition between a first sleep mode 301 and a second sleep mode 302, wherein in the first sleep mode 301 the second module 414 operates at a lower power state compared with a non-sleep mode. In the second sleep mode 302, the third and the fourth processors 416 and 418 of the second module 414 are powered off. In another example, the second processor 408 may control the first power switch 412. The third processor 416 may be configured to control the second power switch 414.

In another example, the first power switch 412 may control a first electrical power delivered to the third processor 416. The second power switch 414 may control a second electrical power delivered to the fourth processor 418. In another example, the voltage regulator 422 may regulate a level of a third electrical power delivered to the second DRAM 420.

Figure 5:
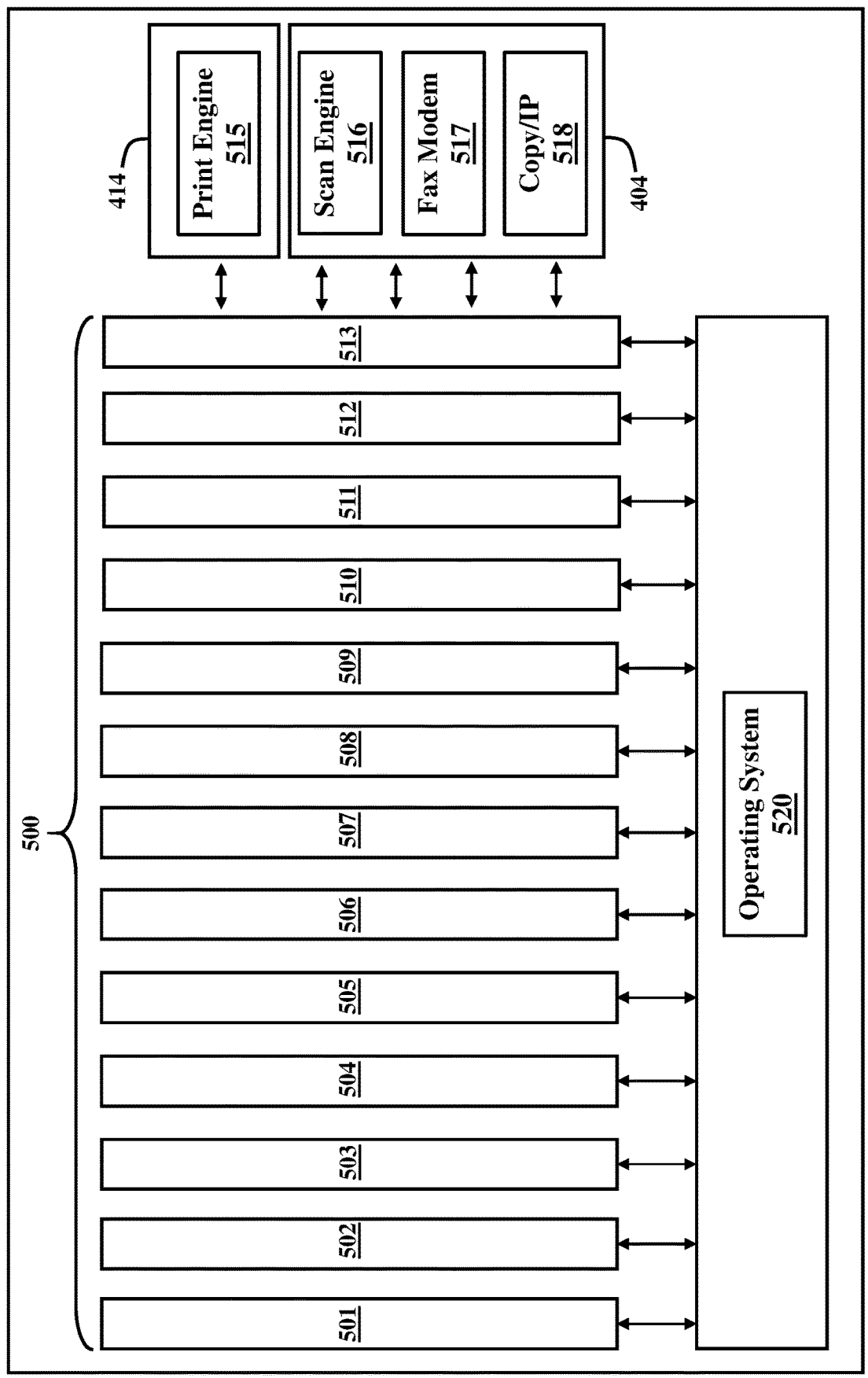
FIG. 5 is a schematic block diagram illustrating firmware interactions in a computer system, according to an example herein.

The examples herein may utilize firmware updates to the computer system 100 to allow for implementations to permit saving and restoring of data saved in memories 104, 114 as well as resume the full operation of the processors 108, 118 where the execution was previously stopped before switching to a lower power state including powering off. FIG. 5, with reference to FIGS. 1 through 4, illustrates a block diagram of the firmware interactions with the computer system 100, of FIG. 1. Various operations 500 of a printing device 202 may be managed by the computer system 100. For example, the operations may include scan operations 501, fax operations 502, photo operations 503, copy operations 504, digital send operations 505, cloud connection operations 506, web infrastructure operations 507, network application operations 508, user interface operations 509, application X operations 510, framework operations 511, print languages operations 512, and life saver operations 513. In an example, the application X operation may be any future or new application that is added to the operations 500. Each of the operations 500 send/receive instructions from the second module 112. In an example, the second module 414 may control the print engine 515. In an example, the first module 404 may control the scan engine 516, fax modem engine 517, and copy/internet protocol (IP) engine 518. In the context of the examples herein, the engines 515, 516, 517, 518 may refer to various processors and processing sub-units of the second module 112. The processors may include any type of general purpose processor, microcontroller, application specific processor, application specific integrated circuit, and digital signal processor, for example. The various operations 500 further communicate with an operating system 520, such as a Linux® Kernel operating system or a Thread-X® operating system, for example, which manages the shared file system and networking communications, among other processes, for the computer system 100. In an example, the Linux® Kernel operating system may control the first processor 406, and the Thread-X® operating system may control the second, third, and fourth processors 408, 416, and 418.

Figure 6:
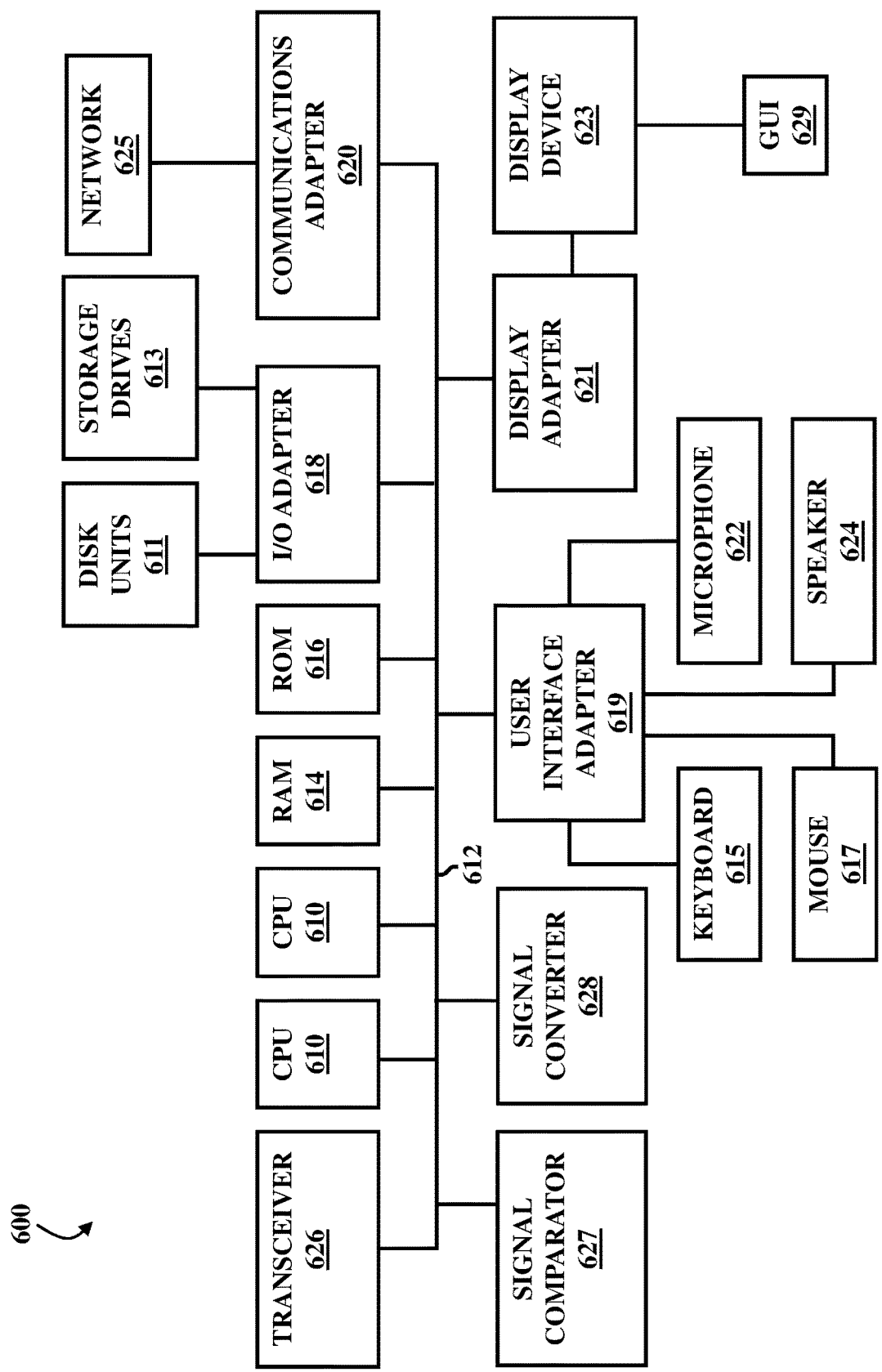
FIG. 6 is a schematic diagram illustrating a computer system according to an example herein.

A representative hardware environment for practicing the examples herein, such as for providing the firmware updates to the computer system 1, is depicted in FIG. 6, with reference to FIGS. 1 through 5. FIG. 6 illustrates a hardware configuration of an information handling/computer system 600 according to an example. In an example, the system 600 may be included in the first module 102. The system 600 comprises at least one processor or CPU 610. The system 600 illustrates multiple CPUs 610 according to an example. The CPUs 610 are interconnected via system bus 612 to various memory devices 614, 616 such as a RAM 614 and a ROM 616. The memory devices 614, 616 may include local memory employed during actual execution of the program code, bulk storage, and cache memories which provide temporary storage of at least some program code in order to reduce the number of times code must be retrieved from bulk storage during execution. An I/O adapter 618 can connect to peripheral devices, such as disk units 611 and storage drives 613, or other program storage devices that are readable by the system 600. The system 600 further includes a user interface adapter 619 that may connect to a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623, which provides a graphical user interface, GUI, 629 for a user to interact with. Further, a transceiver 626, a signal comparator 627, and a signal converter 628 may be operatively connected to the bus 612 for processing, transmission, receipt, comparison, and conversion of electric or electronic signals, respectively.

The various examples described herein provide a technique to allow an electronic device, such as a printing device 202 to adaptively transition between multiple sleep modes; e.g., reduced power consumption modes, without causing a noticeable difference to the user of the printing device 202. The examples herein permit synchronization amongst the various sub-systems of the computer system 100 to permit quick and seamless transition in and out of lower power states without effecting a user's interaction with the printing device 202.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A computer system comprising:
   a first module comprising:
      a first memory; and
      a first system on chip (SoC) comprising a first microprocessor;
   a second module comprising:
      a second memory; and
      a second SoC comprising a second micro-processor;
   a peripheral component interconnect express (PCI-e) bus operatively connected to each of the first module and the second module, wherein the second module is set to enter a sleep mode state comprising:
      a first sleep mode; and
      a second sleep mode,
   wherein the second module is set to:
      transition between the first sleep mode and second sleep mode while the second module is in the sleep mode state; and
      before the second module transitions to the second sleep mode, store operating information indicating an operating state of the second SoC in the second memory, send a sleep signal to the first module, and send a location of the second memory where the operating information is stored to the first module, and
   wherein the second SoC is set to:
      reduce a power state of the second module during the first sleep mode; and
      power off the second SoC during the second sleep mode.

2. The computer system of claim 1, wherein the second module is set to suspend direct memory access to the second memory while the second module is in the second sleep mode.

3. The computer system of claim 1, wherein the second memory is set to retain the operating information in a self-refresh mode while the second module is in the second sleep mode, wherein an interrupt signal on the PCI-e bus is disabled while the second module is in the second sleep mode, and wherein the interrupt signal interrupts a process running on the second micro-processor when the second micro-processor is in an active mode.

4. The computer system of claim 1, wherein the first module is set to send a power up signal to transition the second module from the second sleep mode to the first sleep mode.

5. The computer system of claim 4, wherein the first module is set to:
   enable the PCI-e bus; and
   send the location to the second module before the second module transitions from the second sleep mode to the first sleep mode.

6. The computer system of claim 4, wherein the first module is communicatively coupled to any of a control panel, door, and USB port of a printing device, and wherein the second module is set to control any of a motor, ink, and print head of the printing device.

7. The computer system of claim 6, wherein the first module is set to send the power up signal to the second module when the first module detects an activity on any of the control panel, door, and USB port of the printing device.

8. A non-transitory computer readable medium comprising code set to:
set a first activity timer for a first computer processor;
interrupt the first activity timer when any of a plurality of events is detected;
transition a second computer processor to a first sleep mode when the first activity timer expires, wherein the second computer processor consumes lower power in the first sleep mode compared with a non-sleep mode;
set a second activity timer for the first computer processor when the second computer processor is in the first sleep mode;
store a first portion of the configuration of the second computer processor in a second memory linked to the second computer processor when the second timer expires;
store a second portion of a configuration of the second computer processor in a first memory linked to the first computer processor;
store, by the second computer processor, operating information indicating an operating state of the second computer processor in the second memory;
send a sleep signal and a location of the second memory where the operating information is stored, from the second computer processor to the first computer processor;
after the operating information has been stored in the second memory and the second computer processor has sent the sleep signal and the location of the second memory to the first computer processor, transition the second computer processor to a second sleep mode;
turn off the power of the second computer processor; and
disable communication to the second memory when the second computer processor is in the second sleep mode.

9. The non-transitory computer readable medium of claim 8, wherein the code is set to:
disable a PCI-e bus communicatively coupling the first and second computer processors while the second computer processor is in the second sleep mode;
identify communication of the first computer processor to any of a control panel, door, and USB port of a printing device;

send a power up signal to transition the second computer processor from the second sleep mode to the first sleep mode;
send the power up signal to the second computer processor when the first computer processor detects an activity on any of the control panel, door, and USB port of the printing device; and
instruct the second computer processor to control any of a motor, ink, and print head of the printing device.

10. A power management system comprising:
an input power source;
a first module comprising:
a first processor electrically coupled to the input power source;
a second processor electrically coupled to the first processor; and
a first dynamic random access memory (DRAM) electrically coupled to the first and second processors;
a first power switch electrically coupled to the input power source and to the second processor;
a second module comprising:
a voltage regulator electrically coupled to the first processor;
a second DRAM electrically coupled to the voltage regulator;
a third processor electrically coupled to the first power switch;
a fourth processor electrically coupled to the third processor;
a second power switch electrically coupled to the voltage regulator and the fourth processor,
wherein the second module is set to transition between a first sleep mode and a second sleep mode, wherein in the first sleep mode the second module operates at a lower power state compared with a non-sleep mode, and wherein in the second sleep mode the third processor and the fourth processor of the second module are powered off.

11. The power management system of claim 10, wherein the second processor is set to control the first power switch, and wherein the third processor is set to control the second power switch.

12. The power management system of claim 10, wherein the first power switch is set to control a first electrical power delivered to the third processor, and wherein the second power switch is set to control a second electrical power delivered to the fourth processor.

13. The power management system of claim 12, wherein the voltage regulator is set to regulate a level of a third electrical power delivered to the second DRAM.

* * * * *